(12) United States Patent  
Samson (10) Patent No.: US 7,101,516 B2  
(45) Date of Patent: Sep. 5, 2006

(54) REGENERATOR

(75) Inventor: Rene Samson, Amsterdam (NL)

(73) Assignee: Shell Oil Company, Houston, TX (US)

( * ) Notice: Subject to any disclaimer, the term of this patent is extended or adjusted under 35 U.S.C. 154(b) by 137 days.

(21) Appl. No.: 10/333,439

(22) PCT Filed: Jul. 17, 2001

(86) PCT No.: PCT/EP01/08291

§ 371 (c)(1),  
(2), (4) Date: Jan. 21, 2003

(87) PCT Pub. No.: WO02/08359

PCT Pub. Date: Jan. 31, 2002

(65) Prior Publication Data

US 2003/0143126 A1    Jul. 31, 2003

(30) Foreign Application Priority Data

Jul. 21, 2000    (EP) .................................. 00202635

(51) Int. Cl.  
*B01J 8/18*   (2006.01)  
*B01J 8/24*   (2006.01)  
*B01J 8/26*   (2006.01)

(52) U.S. Cl. ...................... 422/142; 422/139; 422/141; 422/143; 422/145; 422/147

(58) Field of Classification Search ................ 422/139, 422/141, 142, 143, 144, 145, 147  
See application file for complete search history.

(56) References Cited

U.S. PATENT DOCUMENTS 4,118,337 A    10/1978    Gross et al.  
4,435,282 A    3/1984    Bertolacini et al.  
5,198,397 A    3/1993    Raterman

FOREIGN PATENT DOCUMENTS

EP    0 457 540 A1    11/1991  
EP    0 610 186 B1    8/1994  
GB    769.818    3/1957

*Primary Examiner*—Alexa D. Neckel  
(74) *Attorney, Agent, or Firm*—Charles W. Stewart (57) ABSTRACT

Described is a catalyst regenerator system that includes a regenerator vessel within which is a verticaliy extending partition that divides a fluidized bed zone of the regenerator vessel into a dense phase fluidized bed zone and a fast-fluidized bed zone. Apparatus is provided to introduce spent catalyst into the fast-fluidized bed zone and to remove regenerated catalyst from the dense phase fluidized bed zone. The partition is equipped with openings that provide for the flow of catalyst from the dense phase fluidized bed zone to the fast-fluidized bed zone.

23 Claims, 5 Drawing Sheets

Fig.1.
STATE OF THE ART

REGENERATOR

FIELD OF THE INVENTION

The invention is related to an improved regenerator vessel. The regenerator vessel can be suitably used in a fluidised catalytic cracking (FCC) process. The regenerator vessel is provided with means to supply catalyst particles, means to supply an oxygenate gas, means to discharge regenerated catalyst, means to discharge combustion gases from the vessel and means to separate entrained catalyst from the combustion gases, which vessel also comprises, in use, a fluidised bed zone of catalyst at its lower end.

BACKGROUND OF THE INVENTION

Such regenerator vessels are for example described in U.S. Pat. No. 4,435,282. This publication describes a vessel comprising at its lower end a bubbling fluidised bed of catalyst in which the combustion of coke present on the catalysts to be regenerated takes place.

A disadvantage of the bubbling bed regenerator as described in U.S. Pat. No. 4,435,282 is that they are troubled with stagnant beds, due to poor catalyst flow patterns, and regeneration gas bypassing, due to the formation of large bubbles within the bubbling dense bed.

An alternative to the bubbling bed regenerator is the so-called "High Efficiency Regenerator" (HER) design as described in EP-A-610186. The regeneration is performed in a fast-fluidised bed for most of the coke combustion and a dilute phase transport riser for some CO combustion. Regenerated catalyst is collected in a bubbling dense bed for reuse and for recycle to the coke combustor. The regeneration of catalysts is more efficient than in the bubbling bed regenerator. As a result the catalyst inventory required in a FCC unit having such a regenerator can be smaller than the inventory of a FCC unit having a bubbling bed regenerator. This is advantageous, for example because such a FCC unit can refresh or change its catalyst inventory in a more efficient manner.

A disadvantage of the "High Efficiency Regenerator" (HER) design as for example described in EP-A-610186 is their mechanical and operational complexity. For example the regenerator vessel consists of two stacked vessels comprising three different fluidised bed regimes.

GB-A-769818 discloses a vessel, wherein both stripping and regeneration is performed. Catalyst from the FCC reactor is supplied to an inner vessel zone wherein catalyst is stripped to obtained spent catalyst. The spent catalyst can flow via openings from inner vessel space to the outer vessel space. In the latter space regeneration takes place.

U.S. Pat. No. 5,198,397 describes a regenerator wherein the spent catalyst is directly introduced in a fast-fluidised bed zone located centrally in a regenerator vessel. The required temperature for achieving a sufficient combustion of the coke from the catalyst is achieved by mixing the spent catalyst with part of the regenerated catalyst at the catalyst inlet. The partly regenerated catalyst then flows to a second fluidised bed located in the annular space between the centrally located fast-fluidised bed zone and the regenerator vessel wall. Disclosed is a regeneration process wherein partial combustion takes place in the fast-fluidised bed and total combustion takes place in the second fluidised bed. In order to avoid after burning in the upper part of the regenerator vessel, when the effluent gasses of both fluidisation zones meet, a special cyclone arrangement is proposed.

SUMMARY OF THE INVENTION

The present invention is directed to a more simple design for the High Efficiency Regenerator than the stacked vessels of the prior art design.

This object is achieved by the following apparatus.

Regenerator vessel provided with means to supply catalyst particles, means to supply an oxygenate gas, means to discharge regenerated catalyst, means to discharge combustion gases from the vessel and means to separate entrained catalyst from the combustion gases, which vessel also comprises, in use, a fluidised bed zone of catalyst at its lower end, wherein in the fluidised bed zone a vertically extending partition, which partition is provided with one or more openings, is present dividing the fluidised bed zone in a dense phase fluidised bed zone and a fast-fluidised bed zone, the dense phase fluidised bed zone provided with the means to supply catalysts and the fast-fluidised bed zone provided with the means to supply an oxygenate gas at its lower end.

BRIEF DESCRIPTION OF THE DRAWING

The FIG. shows an embodiment of the fluidized catalytic cracking reactor vessel of the invention.

DETAILED DESCRIPTION OF THE INVENTION

The regenerator vessel according to the invention provides a simple one vessel design. In use, a fast-fluidized bed is present in one fluidized bed zone resulting in an efficient combustion of the coke. The total catalyst inventory of the regenerator according to the invention will be significantly smaller when compared with a conventional bubbling bed regenerator having the same vessel volume. This is because the density in the fast-fluidized bed zone will be much smaller than in a conventional bubbling bed regenerator and because the bed level in the dense fluidized bed can be maintained at a lower level than the bed level of the bubbling bed regenerator. A further advantage is that existing bubbling bed regenerators can be easily modified to the regenerator vessel according to the present invention, for example by providing the existing vessel with the necessary means to supply oxygenate gas and a partition to create the two fluidized bed zones. Existing cyclone arrangements of the existing regenerator can advantageously also be used in the regenerator according to this invention. This latter aspect of the invention is especially advantageous regarding the fact that the vast majority of the currently existing FCC units are equipped with a regenerator operating in the bubbling bed mode combined with a general need to operate a FCC unit with a lower catalyst inventory.

With "fast-fluidized bed zone" is especially meant a fluidized bed having a catalyst density of between 50 and 400 kg/m$^3$, and preferably lower than 300 kg/M$^3$. The superficial gas velocity is typically higher than 1.5 m/s and more preferably between 2 and 6 m/s. The gas fraction in the fast-fluidized bed zone will suitably flow upwards without significant backmixing resulting in an efficient combustion of the coke from the catalyst. In contrast the catalyst particles to be regenerated will flow upwards with a considerable backmixing in the fast-fluidized bed zone.

With "dense phase fluidized bed zone" is especially meant a fluidized bed having a catalyst density of between 300 and 900 kg/m$^3$. The density of the dense phase fluidized bed zone is always higher than the density of the fast-fluidized bed zone. More preferably the superficial gas velocity is less than 0.3 m/s and more preferably between 0.01 and 0.1 m/s. By operating the dense phase fluidized bed zone at such low gas velocities less deactivation of the catalyst will take place in said zone because of the lower temperature level and lower steam partial pressure. Due to the low gas velocity and lower temperature in this zone only a small part of the coke combustion will take place in this zone. In essence, the dense fluidization zone will act as a storage vessel rather than a regeneration zone. Thus, the time in which the catalyst is subjected to the more rigorous deactivation conditions, i.e. as in the fast-fluidized bed zone, is reduced when compared to the state of the art bubbling bed regenerator. Moreover, the problems with two different effluent gasses as described in U.S. Pat. No. 5,198,397 are also not to be expected. For this reason no modifications of the existing cyclone arrangement will be required.

Part of the catalyst will be entrained from the fast-fluidized bed zone to the upper end of the regenerator vessel. These catalyst particles will be separated from the gases leaving the regenerator vessel in the separation means. These separation means are suitably state of the art cyclone separators, comprising primary cyclones and secondary cyclones. The secondary cyclones further separate catalyst particles from the gaseous effluent of the primary cyclones. See also for example "Fluid Catalytic Cracking Technology and Operations", Joseph W. Wilson, Penn Well Books, Tulsa, 1997, pages 183–185.

In one preferred embodiment of the invention the means to discharge regenerated catalysts from the regenerator will be positioned at the lower end of the fast-fluidised bed zone. The catalyst particles which have been regenerated in the fast-fluidised bed mode will be returned to this bed from the upper end of the regenerator vessel via for example the diplegs of the primary and secondary cyclones. These returned catalyst particles will flow mainly downwards in the fast-fluidised bed zone to be discharged from the regenerator vessel in the lower end thereof. If the openings in the partition are located relatively near to the lower end of the vessel and thus near to these means to discharge regenerated catalyst means to avoid catalysts from catalyst short-cutting from the openings in the partition to the discharge opening are preferably present. Preferably such means are a shield spaced above the catalyst outlet opening in the fast-fluidised bed zone. A further preferred manner of discharging the generated catalyst is shown in FIG. 4.

With a "vertically extending partition" is understood a vertical partition or a more inclined partition which divides the fluidized bed in two bed fluidized zones when viewed from above. Preferably the partition is for its main or entire part a vertical partition. The vertical extending partition in the regenerator according to the invention can be a flat plate. Optionally, but not preferred, more partitions can be present resulting in more than two fluidized bed zones of which at least one is a fast-fluidized bed zone and one is the dense phase fluidized bed zone as described above. Preferably the vertical partition has a tubular design resulting in an annular outer fluidized bed zone and a circular inner fluidized bed zone. The diameter of the tubular partition may be smaller at its lower end in order to accommodate for example the fluidization means of the outer fluidized bed zone.

Figure 2:
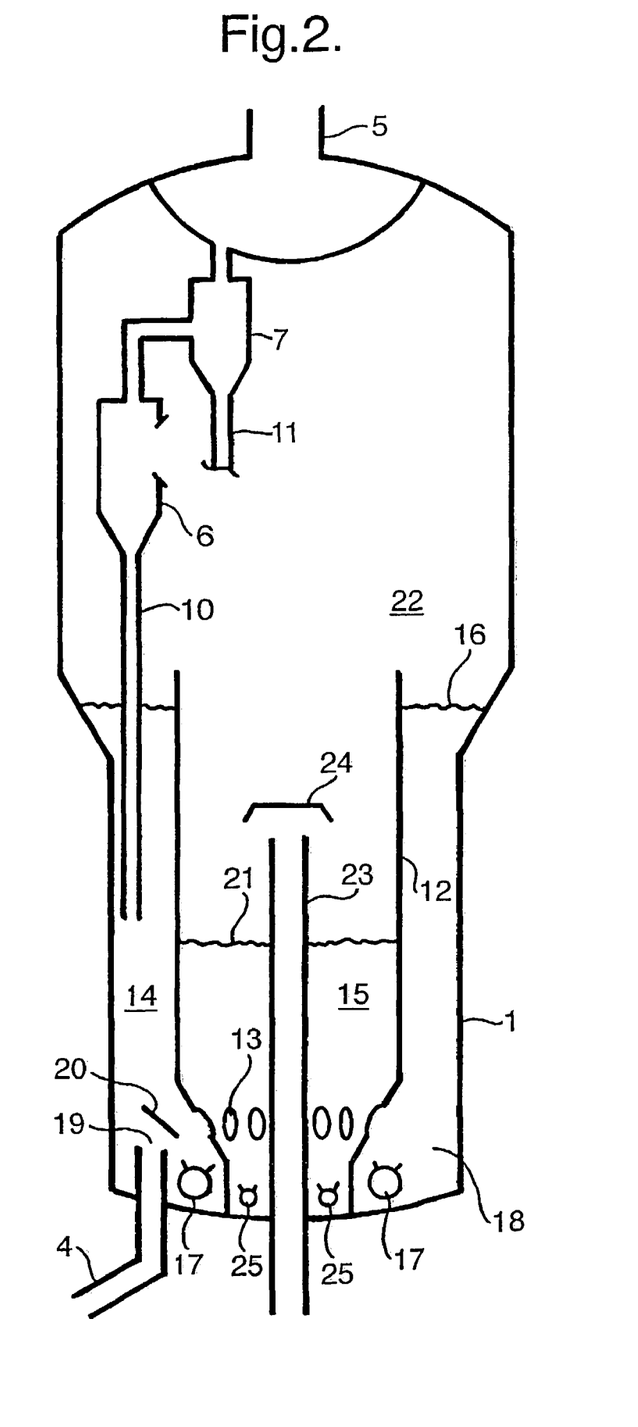
FIG. 2 represents first embodiment of the regenerator vessel according to the invention.
Figure 3:
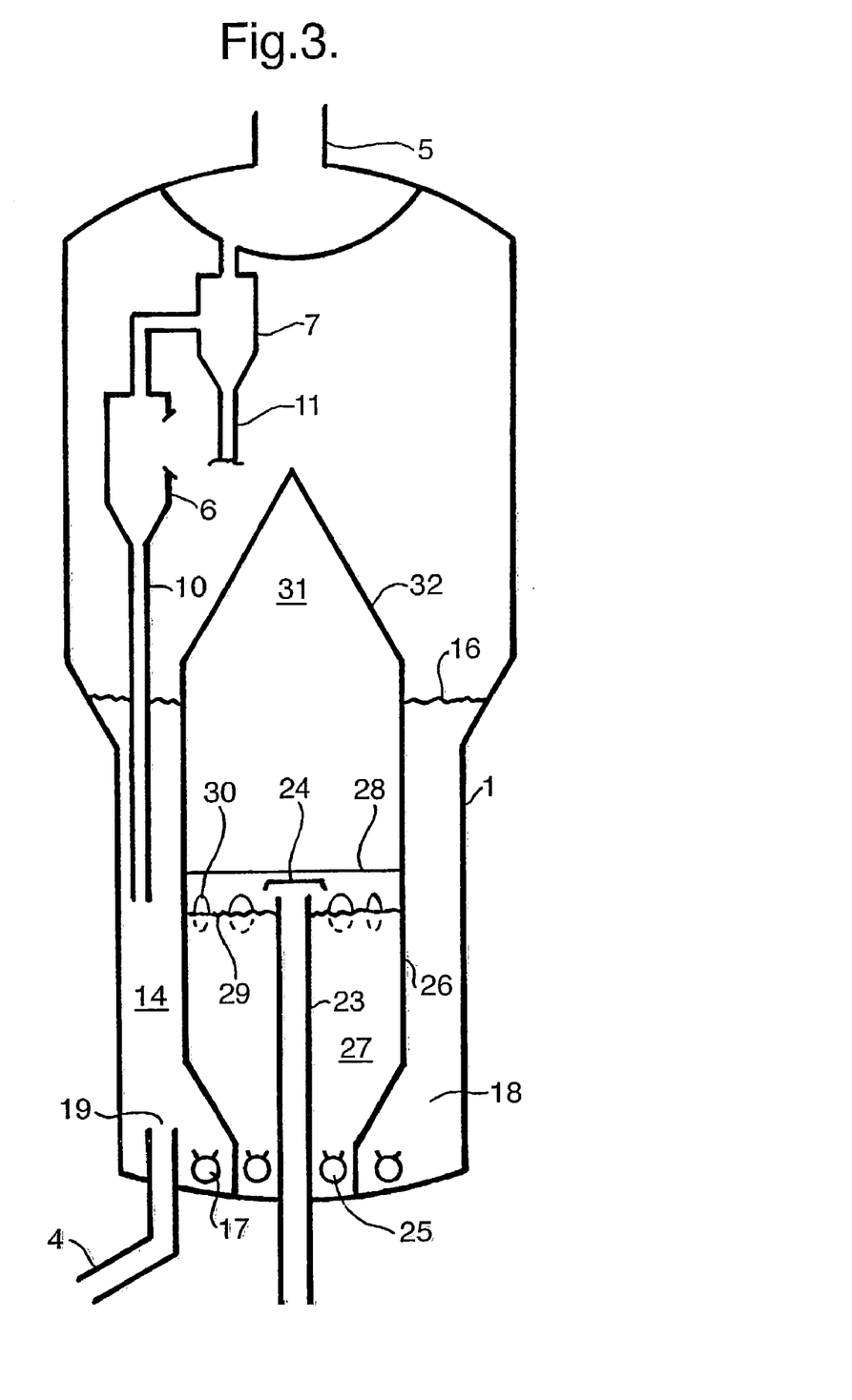
FIG. 3 represents a second embodiment of the regenerator vessel according to the invention.
Figure 4:
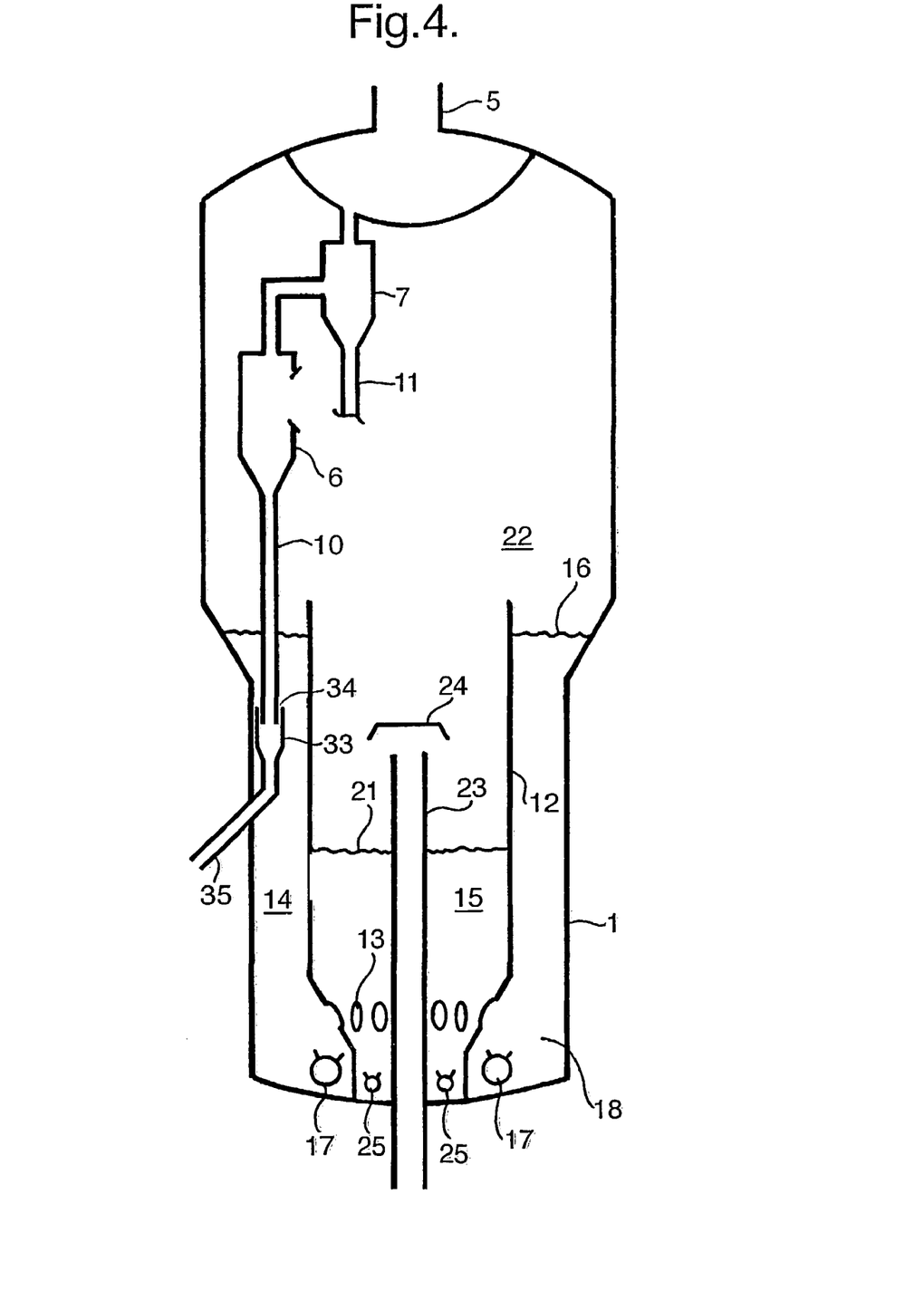
FIG. 4 represents a third embodiment of the regenerator vessel according to the invention.

If the partition is of a tubular design the outer fluidized bed zone can be the fast-fluidized bed zone and the inner fluidized bed zone is then the dense phase fluidized bed zone as shown in FIGS. 2–4. This embodiment has the advantage that a favorable bed aspect ratio is achieved for the fast-fluidized bed zone, which is in turn beneficial to achieve axial staging of the gas phase. Axial staging of the gas phase is in turn advantageous for the efficiency of the regenerator performance. More preferably, the inner fluidized bed zone is the fast-fluidized bed zone and the outer fluidized bed zone is the dense phase fluidized bed zone. The advantages of this embodiment are that regenerated catalyst can be more easily discharged from the regenerator vessel and because a premixing of spent catalyst and regenerated catalyst, as discharged from the primary cyclone diplegs, can be more easily achieved in the dense fluidized bed zone. See also FIG. 5.

The ratio of the cross-sectional area of the fast and dense fluidised bed zone is preferably between 1:5 and 2:1. More preferably less than 60% of the cross-sectional area of the regenerator vessel is occupied by the fast-fluidised bed zone. A practical optimum is that about 50% of the cross-sectional area of the regenerator vessel is occupied by the fast-fluidised bed zone. In case the annular space comprises the fast-fluidised bed zone, the annular space between the tubular partition and the vessel wall is suitably between 3 and 20% of the tubular regenerator vessel diameter.

The openings in the partition should be small enough to avoid a massive flow of oxygenate gas flow from the fast-fluidised bed zone to the dense fluidised bed zone. These openings should also be large enough to permit a free flow of catalyst from the dense fluidised bed zone to the fast-fluidised bed zone. The total area of the openings will depend on the amount of catalyst to be regenerated. Assuming that the total catalyst flux through the sum of all openings is between 750 and 1500 kg/m$^2$.s it is possible to calculate the required area of said openings.

The openings are preferably evenly spaced along the partition to ensure that the fast-fluidized bed zone is provided along its entire base with catalyst to be regenerated. For examples in case of a tubular partition the openings are suitably provided along its entire circumference. [The resulting evenly and trouble-free distribution of catalyst combined with the small bed aspect ratio of the fast-fluidized bed is advantageous because it limits the chances of after burning.]

The partition may be open at its upper end such that the dense and fast-fluidized bed zones are in open communication with the upper end of the regenerator vessel. Preferably, the openings in the partition are then positioned at the lower end of the partition. Part of the relatively hot catalyst particles present in the upper end of the regenerator vessel can then enter the dense fluidized bed zone from above resulting in a temperature rise in this bed. The catalyst particles present in the upper end of the regenerator vessel are entrained catalyst particles from the fast-fluidized bed. Part of these catalyst particles will have been separated from the gases leaving the regenerator in the means to separate entrained catalyst from the combustion gases.

In case the inner fluidised bed zone is the dense fluidised bed zone the vertical partition may also be closed at its upper end such that said dense fluidised bed zone is not in open communication with the upper end of the regenerator vessel. In this embodiment the openings in the partition can be advantageously positioned at an elevated position in the vertical partition. The higher position is preferred because less short-cutting as described above will occur.

The present invention is also directed to a process for regeneration of spent catalyst in a regenerator vessel, wherein (a) spent catalyst is supplied to a dense fluidised bed present in a regenerator vessel, (b) supplied from the dense fluidised bed to a fast-fluidised bed present in the regenerator vessel, (c) contacted with an oxygenate gas as fluidising medium in the fast-fluidised bed at a catalyst density of between 50 and 400 kg/m$^3$, and (d) obtaining regenerated catalyst from the lower end of the fast-fluidised bed. Preferably the catalyst is a spent catalyst of a fluidised catalytic cracking (FCC) process. Preferably such a process is performed in a regenerator vessel as described above.

With "spent catalyst" is meant catalyst which has been used to crack hydrocarbons in a fluid catalytic cracking (FCC) process and which has been stripped, with for example steam, to remove hydrocarbons from the catalyst. The remaining so-called spent catalyst will contain coke, which is removed in the regenerator according to the present invention.

The oxygenate gas used in the fast-fluidised bed is a gas comprising an oxygenate, preferably oxygen. A preferred gas is air or air enriched in oxygen. The gas used in the dense phase fluidised bed can be an inert gas, for example nitrogen, or recycled combustion gases. Preferably the fluidising gas in the dense phase fluidised bed zone is an oxygenate gas. It can also be a mixture of a fuel containing gas and an oxygenate, for example air and dry gas as obtained in the FCC process. In this manner the temperature of the catalyst to be regenerated can be further raised before they are discharged to the fast-fluidised bed zone. This last embodiment is preferably used in a regenerator according to the invention wherein the partition is closed at the top. This design reduces the chances of after burning of the dry gas in the top of the regenerator and further. More preferably the same gas is used as fluidising gas in the fast-fluidised bed zone and the dense phase fluidised bed zone. The volume ratio of oxygenate gas added to the dense phase fluidised bed zone and the volume added to the fast-fluidised bed zone is preferably between 1:40 and 1:5 and more preferably between 1:20 and 1:5.

The invention is also directed to a method to retrofit an existing regenerator vessel provided with means to supply catalyst particles, means to supply an oxygenate gas, means to discharge regenerated catalyst, means to discharge combustion gases from the vessel and means to separate entrained catalyst from the combustion gases, which vessel also comprises, in use, a fluidised bed zone of catalyst at its lower end, by adding a partition in the fluidised bed zone in order to arrive at a regenerator vessel as described above. Preferably no or small changes are applied to the means to separate entrained catalyst from the combustion gases.

Figure 1:
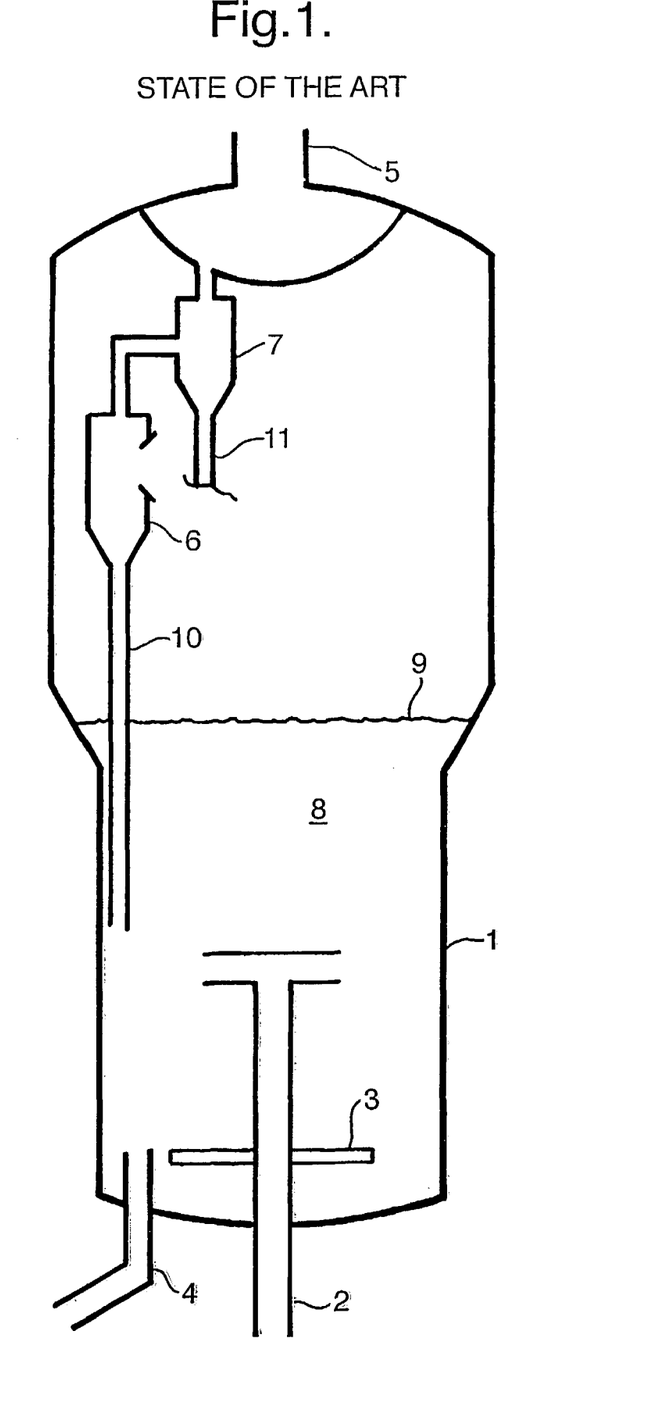
FIG. 1 represents a state of the art bubbling bed regenerator.

FIG. 1 shows a state of the bubbling bed regenerator vessel (1) provided with means to supply catalyst particles via catalyst distributor (2), means to supply an oxygenate gas via gas ring (3), means to discharge regenerated catalyst via conduit (4), means to discharge combustion gases from the vessel via conduit (5) and means to separate entrained catalyst from the combustion gases by primary (6) and secondary (7) cyclones, of which only one set is shown for purposes of clarity. At its lower end the vessel (1) also comprises, in use, a bubbling fluidized bed zone (8) having an upper bed level (9). Both primary cyclone (6) and secondary cyclone (7) are provided with diplegs (10) respectively (11) (partly shown).

FIG. 2 shows the same vessel as in FIG. 1, but now provided with a tubular partition (12), which partition (12) is provided with several openings (13) along its circumferential. The tubular partition divides the fluidized bed zone of the regenerator in a outer fluidised bed zone (14) and an inner fluidised bed zone (15). In this embodiment the outer fluidized bed zone (14) is the fast-fluidized bed zone having an elevated bed level (16). The outer fluidized bed zone (14) is further provided at its lower end (18) with a gas supply ring (17) as means to supply an oxygenate gas. Above the catalyst inlet opening (19) of the conduit (4) a plate (20) is positioned to prevent catalyst from short cutting from openings (13) to inlet opening (19). The catalyst inlet opening (19) can be as described in WO-A-0050165. The inner fluidized bed zone (15) is the dense phase fluidized bed having a lower bed level (21) than bed level (16). This bed level (21) is lower than bed level (16) because the partition is in open communication with the upper end (22) of regenerator vessel (1) and because of the less turbulent fluidization state of fluidized bed zone (15). Bed level (21) can be located above or below the discharge opening of the vertical supply conduit (23). The dense phase fluidized bed zone is also provided with a means to supply catalyst to be regenerated, which can be a vertical supply conduit (23) provided at its upper end with a catalyst flow directing means (24) to direct catalyst to the dense phase fluidized bed zone (15). Also a gas ring (25) is present to supply a fluidizing gas to dense phase fluidized bed zone (15).

FIG. 3 shows a regenerator vessel (1) according to the invention provided with a partition (26), which is closed at its upper end (28). The partition encloses a dense phase fluidized bed (27) having a bed level (29). The partition is also provided with several openings (30) at a more elevated position than the openings (13) of FIG. 2. The tubular partition walls (26) extend to above the enclosure (28) and to above bed level (16) of the fast-fluidized bed zone (14). The extension encloses an empty space (31), which reduces the volume of the regenerator and improves the dynamic behavior of the fast-fluidized bed zone (14). The extension is provided with an inclined roof (32), which is advantageous to avoid catalyst deposits in the regenerator vessel (1).

FIG. 4 shows the regenerator according to FIG. 2, wherein the outlet for regenerated catalyst is provided by a so-called draw-off bin (33), provided with an opening (34) to receive catalyst particles and a conduit (35) to discharge catalyst from the vessel (1). The opening (34) of the draw-off bin (33) is located suitably below the outlet opening of dipleg (10). The opening (34) of the draw-off bin (33) is preferably located below bed level (16) and suitably in the upper half of the fast-fluidized bed zone (14). The opening (34) is also located such that catalyst from the fast-fluidized bed zone (14), which has not passed dipleg (10), can enter the draw-off bin (33). By directing the opening (34) upwards, the majority of the catalyst discharged via the draw-off bin (33) will be the sufficiently regenerated catalyst particles discharged by dipleg (10).

Preferably one draw-off bin (33) can be positioned between a plurality, preferably 2, of diplegs (10). A typical regenerator can comprise 8–12 primary cyclones (6), which in turn may be coupled as described above to 4–6 draw-off bins (33). In such an embodiment it will be necessary to use non-vertically positioned diplegs (10). Such so-called kinked diplegs preferably have an angle of 15° or less with the vertical. Embodiments with only one draw-off bin (33) are however preferred.

Figure 5:
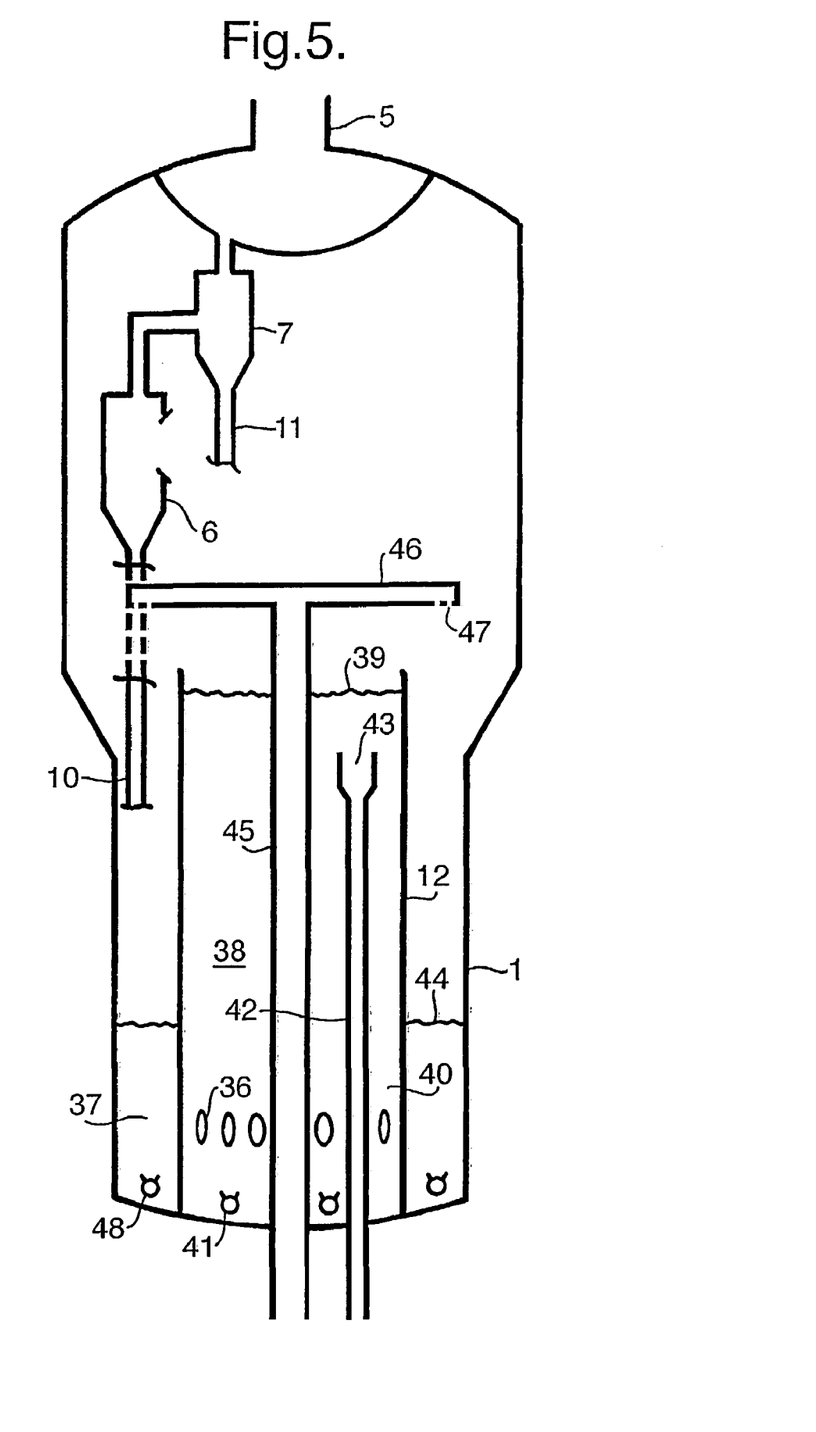
FIG. 5 is a preferred embodiment wherein the fast-fluidized bed zone is located in the inner tubular fluidized bed zone.

FIG. 5 shows the same vessel as in FIG. 1, but now provided with a tubular partition (12) having an open upper end, which partition (12) is provided with several openings (36) along its circumferential. The tubular partition divides the fluidized bed zone of the regenerator in an outer fluidized bed zone (37) and an inner fluidized bed zone (38). In this embodiment the inner fluidized bed zone (38) is the fast-fluidized bed zone having an elevated bed level (39). The inner fluidized bed zone (38) is further provided at its lower end (40) with a gas supply ring (41) as means to supply an oxygenate gas. The inner fluidized bed zone (38) is further provided with a regenerated catalyst draw-off conduit (42) having a catalyst inlet opening (43) located below bed level (39). The outer fluidized bed zone (37) is the dense phase fluidized bed having a significantly lower bed level (44) than bed level (39). To the outer-fluidized bed zone (37) spent catalyst is supplied via spent catalyst supply conduit (45). This centrally located conduit (45) ends at its upper end into a plurality of diverting arms (46) having a discharge opening (47) located above the outer fluidized bed zone (37). Preferably two to eight, and more preferably four or five arms (46) are present such to evenly discharge the spent catalyst. The fluidized bed zone (37) is further provided with a gas ring (48) to supply a fluidizing gas to said dense phase fluidized bed zone.

In use the regenerator of FIG. 5 will receive spent catalyst via (45). This spent catalyst will be discharged into the dense phase fluidised bed zone (37) and pre-heated when mixed with hot regenerated catalyst being discharged from diplegs (10) and (11). This mixture of spent and regenerated catalyst will enter the fast fluidised bed zone (38) via openings (36). In this fast fluidised bed zone (38) the catalyst will move upwardly wherein the majority of the coke present on the catalyst is combusted. Part of the rising catalyst will be discharged via draw-off conduit (42) while the remaining part will enter the regenerator freeboard. Here the catalyst and gas will enter the primary cyclones (6). Separated catalyst is subsequently discharged via diplegs (10) and (11) to the dense phase fluidised bed (37) as stated above.

I claim:

1. A regenerator vessel comprising an upper end and a lower end wherein:
    the lower end comprises:
        a means to supply catalyst particles which is fluidly connected to a fluidized bed zone of catalyst comprising a vertically extending partition, provided with one or more openings, dividing the fluidized bed zone into a dense phase fluidized bed zone and a fast-fluidized bed zone, the dense phase fluidized bed zone provided with the means to supply catalyst and the fast-fluidized bed zone provided with the means to supply an oxygenate gas at its lower end; and,
    the upper end comprises:
        means to discharge regenerated catalyst;
        means to discharge combustion gases from the vessel; and,
        means to separate entrained catalyst from the combustion gases, wherein the vertical partition has a tubular design resulting in an annular outer fluidized bed zone and a circular inner fluidized bed zone, wherein the inner fluidized bed zone is the dense phase fluidized bed zone and the annular outer fluidized bed zone is the fast-fluidized bed zone, and wherein the vertical partition is closed at its upper end such that the dense fluidized bed zone is not in open communication with the upper end of the regenerator vessel and wherein the openings in the partition are positioned at an elevated position in the vertical partition.

2. An FCC catalyst regenerator system, comprising:
    a regenerator vessel having a regenerator vessel upper end and a regenerator vessel lower end and which defines a fluidization zone;
        wherein within said fluidization zone is provided a vertical partition means for dividing said fluidization zone into an inner fluidization zone and an outer fluidization zone;
        wherein said inner fluidization zone includes a dense phase fluidized catalyst bed;
        wherein said outer fluidization zone includes a fast-fluidized catalyst bed; and
        wherein said vertical partition means includes opening means for providing for the flow of catalyst from said inner fluidization zone to said outer fluidization zone;
    means for supplying and directing spent catalyst particles to said inner fluidization zone;
    means for supplying a fluidization gas to said inner fluidization zone to thereby provide said dense phase fluidized catalyst bed having a dense phase density in the range of from 300 to 900 kg/m$^3$;
    means for supplying an oxygenate gas to said outer fluidization zone to thereby provide said fast-fluidized catalyst bed having a fast-fluidized phase density in the range of from 50 to 400 kg/m$^3$ and to provide for the combustion of coke from said spent catalyst particles to thereby yield a regenerated catalyst and a combustion gas with entrained catalyst particles;
    means for discharging said regenerated catalyst from said outer fluidization zone; and
    means for separating said entrained catalyst particles from said combustion gas and for discharging from said regenerator vessel said combustion gas having separated therefrom said entrained catalyst particles;
        wherein said vertical partition means is further defined as having a partition upper end and a partition lower end, and wherein said partition upper end is operatively closed so that there is no open communication between said inner fluidization zone and said regenerator vessel upper end.

3. An FCC catalyst regenerator system as recited in claim 2, wherein said vertical partition means has a tubular design and is positioned in said regenerator vessel so that said outer fluidization zone is an annular fluidization zone and said inner fluidization zone is a circular inner fluidization zone.

4. An FCC catalyst regenerator system as recited in claim 3, wherein said vertical partition means is further defined as having a lower end diameter and an upper end diameter, and wherein said lower end diameter is smaller than said upper end diameter.

5. An FCC catalyst regenerator system as recited in claim 4, wherein said inner fluidization zone is further defined as having a dense phase zone cross section area and a fast phase zone cross sectional area, and wherein the ratio of fast phase zone cross sectional area to dense phase zone cross sectional area is in the range of from 1:5 to 2:1.

6. An FCC catalyst regenerator system, comprising:
    a regenerator vessel having a regenerator upper end and a regenerator lower end and which defines a fluidization zone;
        wherein within said fluidization zone is provided a vertical partition means for dividing said fluidization zone into an inner fluidization zone and an outer fluidization zone;
        wherein said inner fluidization zone includes a fast-fluidized catalyst bed;

wherein said outer fluidization zone includes a dense phase fluidized catalyst bed; and wherein said vertical partition means includes opening means for providing for the flow of catalyst from said outer fluidization zone to said inner fluidization zone;

means for supplying and directing spent catalyst particles to said outer fluidization zone;

means for supplying a fluidization gas to said outer fluidization zone to thereby provide said dense phase fluidized catalyst bed;

means for supplying an oxygenate gas to said inner fluidization zone to thereby provide said fast-fluidized catalyst bed and to provide combustion of coke from said spent catalyst particles to thereby yield a regenerated catalyst and combustion gas with entrained catalyst particles;

means for discharging said regenerated catalyst from said inner fluidization zone; and means for separating said entrained catalyst particles from said combustion gas and for discharging from said regenerator vessel said combustion gas having separated therefrom said entrained catalyst particles.

7. An FCC catalyst regenerator system as recited in claim 6, wherein said dense phase density is higher than said fast-fluidized phase density.

8. An FCC catalyst regenerator system as recited in claim 7, wherein said dense phase fluidized catalyst bed has a dense phase density in the range of from 300 to 900 kg/m$^3$, and wherein said fast-fluidized catalyst bed has a fast-fluidized phase density in the range of from 50 to 400 kg/m$^3$.

9. An FCC catalyst regenerator system as recited in claim 8, wherein said vertical partition means is further defined as having a partition upper end and a partition lower end, and wherein said partition upper end of said vertical partition means is operatively positioned in said regenerator vessel in an open arrangement so that said inner fluidization zone and said outer fluidization zone are in open communication with said regenerator vessel upper end.

10. An FCC catalyst regenerator system as recited in claim 9, wherein said vertical partition means is further defined as having a partition upper end and a partition lower end, and wherein said vertical partition means has a tubular design and is positioned in said regenerator vessel so that said outer fluidization zone is an annular fluidization zone and said inner fluidization zone is a circular inner fluidization zone.

11. An FCC catalyst regenerator system as recited in claim 10, wherein said vertical partition means is further defined as having a lower end diameter and an upper end diameter, and wherein said lower end diameter is smaller than said upper end diameter.

12. An FCC catalyst regenerator system as recited in claim 11, wherein said inner fluidization zone is further defined as having a fast phase zone cross section area and a dense phase zone cross sectional area, and wherein the ratio of dense phase zone cross sectional area to fast phase zone cross sectional area is in the range of from 1:5 to 2:1.

13. An FCC catalyst regeneration process, comprising:
providing a regenerator vessel having a regenerator vessel upper end and a regenerator vessel lower end and which defines a fluidization zone;
wherein within said fluidization zone is provided a vertical partition means for dividing said fluidization zone into an inner fluidization zone and an outer fluidization zone;

wherein said inner fluidization zone includes a dense phase fluidized catalyst bed;

wherein said outer fluidization zone includes a fast-fluidized catalyst bed; and wherein said vertical partition means includes opening means for providing for the flow of catalyst from said inner fluidization zone to said outer fluidization zone;

supplying and directing spent catalyst particles to said inner fluidization zone;

supplying a fluidization gas to said inner fluidization zone to thereby provide said dense phase fluidized catalyst bed having a dense phase density in the range of from 300 to 900 kg/m$^3$;

supplying an oxygenate gas to said outer fluidization zone to thereby provide said fast-fluidized catalyst bed having a fast-fluidized phase density in the range of from 50 to 400 kg/m$^3$ and to provide for the combustion of coke from said spent catalyst particles to thereby yield a regenerated catalyst and a combustion gas with entrained catalyst particles;

discharging said regenerated catalyst from said outer fluidization zone; and separating said entrained catalyst particles from said combustion gas and for discharging from said regenerator vessel said combustion gas having separated therefrom said entrained catalyst particles wherein said vertical partition means is further defined as having a partition upper end and a partition lower end, and wherein said partition upper end is operatively closed so that there is no open communication between said inner fluidization zone and said regenerator vessel upper end.

14. An FCC catalyst regeneration process as recited in claim 13, wherein said vertical partition means has a tubular design and is positioned in said regenerator vessel so that said outer fluidization zone is an annular fluidization zone and said inner fluidization zone is a circular inner fluidization zone.

15. An FCC catalyst regeneration process as recited in claim 14, wherein said vertical partition means is further defined as having a lower end diameter and an upper end diameter, and wherein said lower end diameter is smaller than said upper end diameter.

16. An FCC catalyst regeneration process as recited in claim 15, wherein said inner fluidization zone is further defined as having a dense phase zone cross section area and a fast phase zone cross sectional area, and wherein the ratio of fast phase zone cross sectional area to dense phase zone cross sectional area is in the range of from 1:5 to 2:1.

17. An FCC catalyst regeneration process, comprising:
providing a regenerator vessel having a regenerator upper end and a regenerator lower end and which defines a fluidization zone;
wherein within said fluidization zone is provided a vertical partition means for dividing said fluidization zone into an inner fluidization zone and an outer fluidization zone;
wherein said inner fluidization zone includes a fast-fluidized catalyst bed;
wherein said outer fluidization zone includes a dense phase fluidized catalyst bed; and
wherein said vertical partition means includes opening means for providing for the flow of catalyst from said outer fluidization zone to said inner fluidization zone;

supplying and directing spent catalyst particles to said outer fluidization zone;

supplying a fluidization gas to said outer fluidization zone to thereby provide said dense phase fluidized catalyst bed;

supplying an oxygenate gas to said inner fluidization zone to thereby provide said fast-fluidized catalyst bed and to provide combustion of coke from said spent catalyst particles to thereby yield a regenerated catalyst and combustion gas with entrained catalyst particles;

discharging said regenerated catalyst from said inner fluidization zone; and separating said entrained catalyst particles from said combustion gas and for discharging from said regenerator vessel said combustion gas having separated therefrom said entrained catalyst particles.

18. An FCC catalyst regeneration process as recited in claim 17, wherein said dense phase density is higher than said fast-fluidized phase density.

19. An FCC catalyst regeneration process as recited in claim 18, wherein said dense phase fluidized catalyst bed has a dense phase density in the range of from 300 to 900 kg/m$^3$, and wherein said fast-fluidized catalyst bed has a fast-fluidized phase density in the range of from 50 to 400 kg/m$^3$.

20. An FCC catalyst regeneration process as recited in claim 19, wherein said vertical partition means is further defined as having a partition upper end and a partition lower end, and wherein said partition upper end of said vertical partition means is operatively positioned in said regenerator vessel in an open arrangement so that said inner fluidization zone and said outer fluidization zone are in open communication with said regenerator vessel upper end.

21. An FCC catalyst regeneration process as recited in claim 20, wherein said vertical partition means is further defined as having a partition upper end and a partition lower end, and wherein said vertical partition means has a tubular design and is positioned in said regenerator vessel so that said outer fluidization zone is an annular fluidization zone and said inner fluidization zone is a circular inner fluidization zone.

22. An FCC catalyst regeneration process as recited in claim 21, wherein said vertical partition means is further defined as having a lower end diameter and an upper end diameter, and wherein said lower end diameter is smaller than said upper end diameter.

23. An FCC catalyst regeneration process as recited in claim 22, wherein said inner fluidization zone is further defined as having a fast phase zone cross section area and a dense phase zone cross sectional area, and wherein the ratio of dense phase zone cross sectional area to fast phase zone cross sectional area is in the range of from 1:5 to 2:1.

* * * * *